F. O. LINDGREN.
COFFEEPOT.
APPLICATION FILED FEB. 20, 1922.

1,432,070.

Patented Oct. 17, 1922.

Inventor:
Frank O. Lindgren
Clarence F. Poole
Atty.

Patented Oct. 17, 1922.

1,432,070

UNITED STATES PATENT OFFICE.

FRANK O. LINDGREN, OF CONGRESS PARK, ILLINOIS.

COFFEEPOT.

Application filed February 20, 1922. Serial No. 537,760.

*To all whom it may concern:*

Be it known that I, FRANK O. LINDGREN, a citizen of the United States, residing at Congress Park, in the county of Cook and State of Illinois, have invented an Improvement in Coffeepots, of which the following is a specification.

This invention relates to coffee pots, and more particularly to coffee pots having a removable container for coffee, tea, or the like.

The principal objects of the invention are to produce a simple, durable and sanitary device of the class described in which the coffee container is capable of being securely held in position in the pot, is readily removed therefrom and is readily manipulated for the purpose of filling, emptying or cleaning. These, and other objects of my invention will appear from the following specification and claims, reference being had to the accompanying drawing, in which, Figure 1 is a view in perspective of a coffee pot made in accordance with my invention, with a portion thereof broken away to show the container and means for holding and locking the container in the pot.

Figure 2:
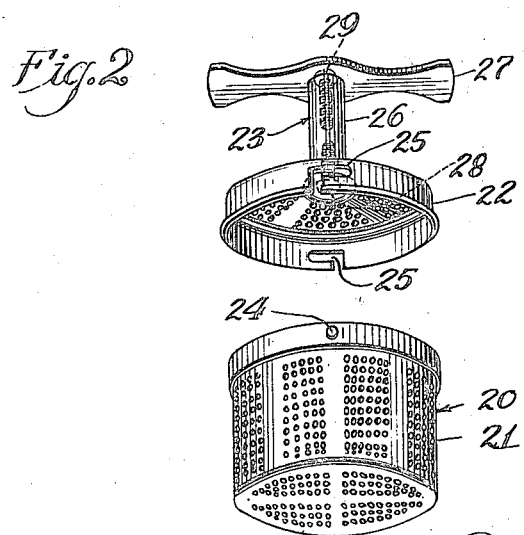

Fig. 2 is a view in perspective showing details of the container, removed from the pot and having its component parts separated as for emptying, filling or cleaning the same.

Figure 1:
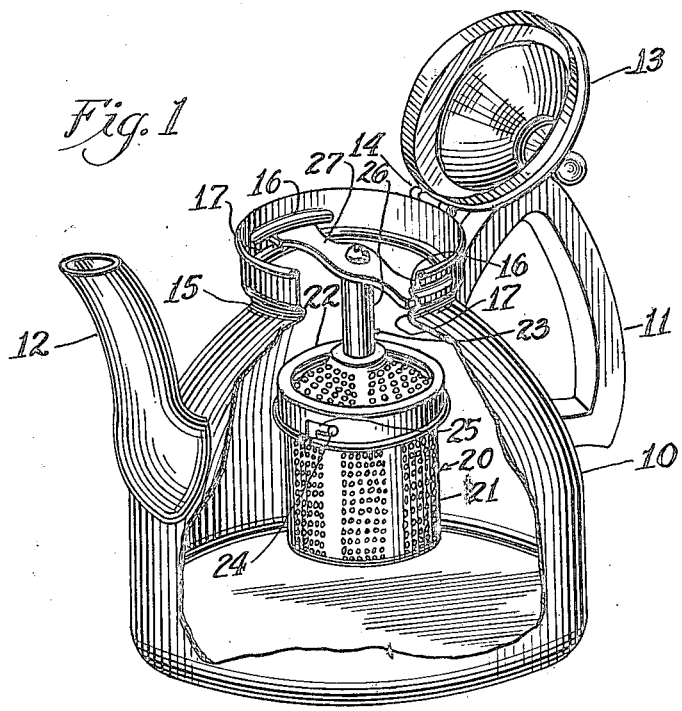

Referring to details of the drawing, Fig. 1 shows a coffee pot comprising a body portion 10, handle 11, spout 12, and a cover 13, hinged to the rim 14 of the pot. The rim joins the body portion 10 at a neck 15, which is slightly smaller in diameter than said rim. The body portion 10, neck 15 and rim 14 are preferably shaped or spun in an integral piece, as shown.

A container 20, adapted to receive dry coffee, tea, or the like, comprises a cylindrical cup member 21, cover 22, and holding member 23 attached to said cover. Said cup member is preferably formed of sheet metal and is provided with perforations in sides and bottom, as shown in Fig. 2. The cover 22 fits over the upper edge of the cup member and is detachably connected therewith by a plurality of bayonet joint connections, comprising a pair of pins 24, 24, on one of said members, as for instance the cup, and a pair of right-angled slots 25, 25, or their equivalents, on the other of said members. The container is supported in the vessel by a suspension rod 26, rigidly attached to the center of the cover 22 by suitable means such as a screw 28, and having a cross-member 27 secured to the upper end thereof by a screw 29. In practice, the cover 13, rod 26 and cross-member 27 are rigidly assembled and are handled as a unit. The cross-member is adapted to fit within and diametrically across the rim 14 and is normally seated on a shoulder 17 forming a part of the neck 15. The rim 14 is provided with a pair of inwardly extending projections 16, 16, arranged at opposite sides thereof, and each spaced from the shoulder 17 to receive the opposite ends of the cross-member therebetween. The cross-member and container carried thereby is locked in place by seating opposite ends thereof on the shoulder 17 adjacent the projections 16, 16, and then rotating the cross-member into engagement under the projections. The projections 16, 16, are preferably formed by embossing or raising the stock of the rim 14 in the manner shown.

Among the chief advantages of a coffee pot constructed as above described are its simplicity in construction, affording cheapness in manufacture, and simplicity in operation, recommending itself particularly to ordinary domestic use. The container is easily secured in place in the pot so that it cannot rattle or be accidentally displaced or shaken out when the pot is handled or inverted, as is often the case with ordinary forms of containers. It is independent of the coffee pot lid, so that the latter may be opened or closed as desired. The container is removed by a simple movement of one hand, the cross-member 27 across the opening of the rim being readily accessible for this purpose. When the container is removed, it is opened in the usual manner by twisting the cup and cover members out of locking engagement, the cross-member 27 forming a convenient handle for this purpose. Both cup and cover are readily cleaned, inside and out, as well as the coffee pot itself, there being no inaccessible corners or surfaces, as is the case in more complicated devices of this class, wherein objectionable accumulations from continued use affect the quality of coffee produced.

I claim as my invention:

1. In a device of the character described, the combination of a vessel provided with an annular rim, a cover for said vessel, a perforated container having detachably connected upper and lower portions, a cross-member disposed diametrically across said rim, a supporting member rigidly connecting said cross-member and the upper portion of said container, and means at opposite sides of said rim for detachably engaging the ends of said cross-member.

2. In a device of the character described, the combination of a vessel provided with an annular rim, a cover for said vessel, a perforated container having detachably connected upper and lower portions, a cross-member disposed diametrically across said rim, a supporting member rigidly connecting said cross-member and the upper portion of said container, and means at opposite sides of said rim for detachably engaging the ends of said cross-member by partial rotation of the latter.

3. In a device of the character described, the combination of a vessel provided with an annular rim and an adjacent neck portion having an upwardly facing shoulder, a cover hinged on said rim, a perforated container comprising upper and lower portions detachably connected together, a cross-member disposed diametrically across said rim and adapted to seat on said shoulder, a supporting member rigidly connecting said cross-member and the upper portion of said container, and a pair of projections on the rim spaced from said shoulder and arranged to engage the ends of said cross-member when the latter is rotated thereunder.

4. In a device of the character described, the combination of a vessel provided with an annular rim and an adjacent neck portion having an upwardly facing shoulder, a cover hinged on said rim, a perforated container comprising upper and lower portions detachably connected together, a cross-member disposed diametrically across said rim and adapted to seat on said shoulder, a supporting member rigidly connecting said cross-member and the upper portion of said container, and a pair of projections on the rim spaced from said shoulder and arranged to engage the ends of said cross-member when the latter is rotated thereunder, said rim, neck and projections being formed integral with the vessel.

Signed at Congress Park in the State of Illinois this 4th day of February, 1922.

FRANK O. LINDGREN.